United States Patent
Lee et al.

(10) Patent No.: US 10,084,174 B2
(45) Date of Patent: Sep. 25, 2018

(54) STACKED TYPE BATTERY MODULE HAVING EASILY MODIFIABLE CONNECTION STRUCTURE

(71) Applicant: LG CHEM, LTD., Seoul (KR)

(72) Inventors: Bum Hyun Lee, Daejeon (KR); Jin-Kyu Shin, Daejeon (KR)

(73) Assignee: LG CHEM, LTD., Seoul (KR)

(*) Notice: Subject to any disclaimer, the term of this patent is extended or adjusted under 35 U.S.C. 154(b) by 199 days.

(21) Appl. No.: 14/909,813

(22) PCT Filed: Aug. 22, 2014

(86) PCT No.: PCT/KR2014/007840
§ 371 (c)(1),
(2) Date: Feb. 3, 2016

(87) PCT Pub. No.: WO2015/026202
PCT Pub. Date: Feb. 26, 2015

(65) Prior Publication Data
US 2016/0197332 A1    Jul. 7, 2016

(30) Foreign Application Priority Data

Aug. 23, 2013 (KR) .................. 10-2013-0100357
Aug. 23, 2013 (KR) .................. 10-2013-0100387

(51) Int. Cl.
*H01M 2/20* (2006.01)
*H01M 2/10* (2006.01)
(Continued)

(52) U.S. Cl.
CPC .......... *H01M 2/206* (2013.01); *B60L 11/1877* (2013.01); *B60L 11/1879* (2013.01);
(Continued)

(58) Field of Classification Search
CPC ............ B60L 11/1877; B60L 11/1879; H01M 2220/20; H01M 2/0212; H01M 2/0275;
(Continued)

(56) References Cited

U.S. PATENT DOCUMENTS

2007/0124980 A1* 6/2007 Yang .................... H01M 2/1077
42/75.03
2010/0009251 A1* 1/2010 Shin ...................... H01M 2/206
429/158
(Continued)

FOREIGN PATENT DOCUMENTS

CN        202839883 U     3/2013
DE        102011117235 A1  5/2013
(Continued)

OTHER PUBLICATIONS

International Search Report, issued in PCT/KR2014/007840, dated Nov. 24, 2014.

Primary Examiner — Lingwen R Zeng
(74) Attorney, Agent, or Firm — Birch, Stewart, Kolasch & Birch, LLP

(57) ABSTRACT

A battery module including unit cells, each of which has electrode terminals formed at one side thereof, cartridges for fixing the unit cells, respectively, and busbars coupled to the electrode terminals for electrically interconnecting the unit cells. The unit cells are mounted at the respective cartridges such that the electrode terminals are opposite to each other, and the electrode terminals are connected in parallel to each other via the busbars such that the cartridges have unit cell parallel connection structures. The cartridges are stacked such that the unit cell parallel connection structures are arranged in a height direction from a ground, and the unit cell parallel connection structures are connected to each other via a series connection member and/or a parallel
(Continued)

connection member for connecting the unit cell parallel connection structures in series and/or in parallel to each other.

21 Claims, 9 Drawing Sheets

(51) Int. Cl.
  *H01M 2/30* (2006.01)
  *B60L 11/18* (2006.01)
  *H01M 2/02* (2006.01)
(52) U.S. Cl.
  CPC ....... *H01M 2/1061* (2013.01); *H01M 2/1077* (2013.01); *H01M 2/202* (2013.01); *H01M 2/204* (2013.01); *H01M 2/30* (2013.01); *H01M 2/305* (2013.01); *H01M 2/0212* (2013.01); *H01M 2/0275* (2013.01); *H01M 2220/20* (2013.01); *Y02T 10/7005* (2013.01); *Y02T 10/705* (2013.01)
(58) Field of Classification Search
  CPC .. H01M 2/1061; H01M 2/1077; H01M 2/202; H01M 2/204; H01M 2/206; H01M 2/30; H01M 2/305; H05K 5/00; Y02T 10/7005; Y02T 10/705
  See application file for complete search history.

(56) References Cited

U.S. PATENT DOCUMENTS

| | | | |
|---|---|---|---|
| 2010/0136420 | A1 | 6/2010 | Shin et al. |
| 2010/0271036 | A1* | 10/2010 | Kishimoto .......... B60L 11/1855 324/434 |
| 2011/0039131 | A1* | 2/2011 | Moon .................... B23K 11/11 429/7 |
| 2011/0091763 | A1 | 4/2011 | Park et al. |
| 2012/0183840 | A1 | 7/2012 | Lee et al. |
| 2013/0122339 | A1* | 5/2013 | Chae .................. B60L 11/1879 429/99 |
| 2013/0236751 | A1 | 9/2013 | Seong et al. |
| 2014/0093752 | A1 | 4/2014 | Shen et al. |
| 2014/0212724 | A1 | 7/2014 | Lee et al. |

FOREIGN PATENT DOCUMENTS

| | | |
|---|---|---|
| EP | 2624334 A2 | 8/2013 |
| JP | 2010-519676 A | 6/2010 |
| JP | 2013-519214 A | 6/2013 |
| KR | 10-2008-0027506 A | 3/2008 |
| KR | 10-2009-0095949 A | 9/2009 |
| KR | 10-2012-0055451 A | 5/2012 |
| KR | 10-2012-0074421 A | 7/2012 |
| KR | 10-2013-0069476 A | 6/2013 |

* cited by examiner

[FIG. 1]
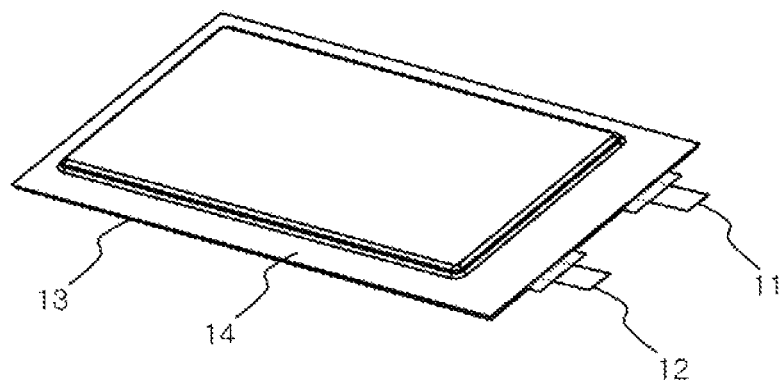
[FIG. 2]
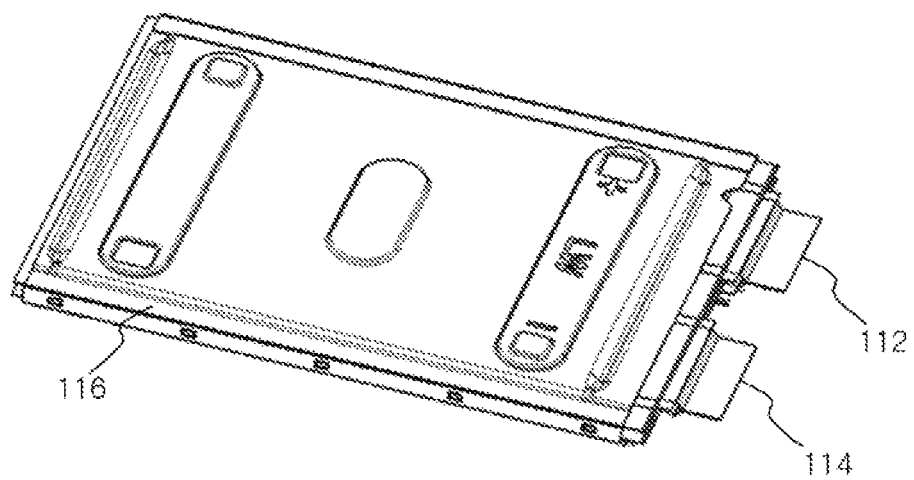

[FIG. 3]
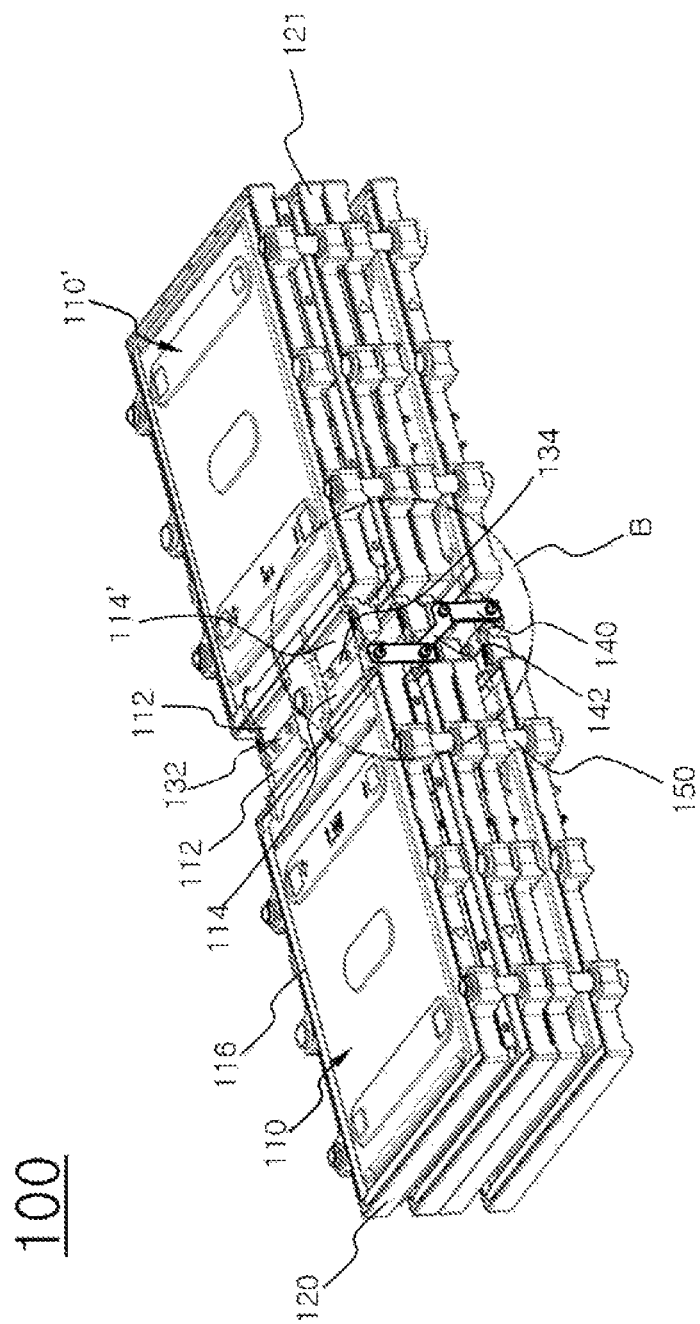

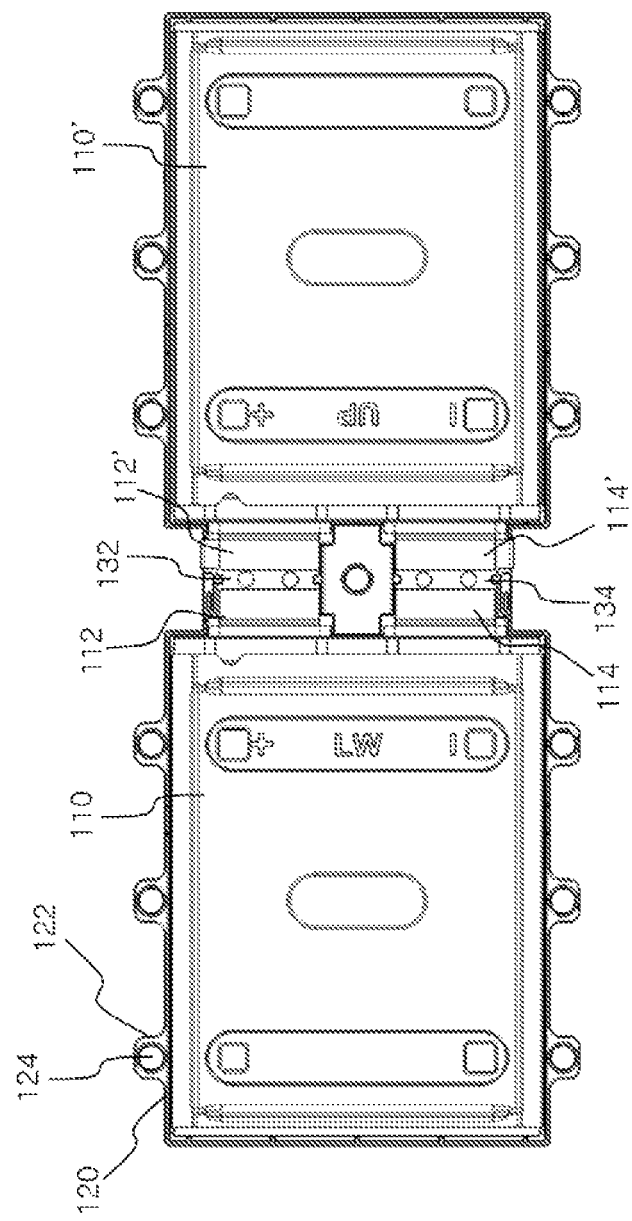
[FIG. 4]

[FIG. 5]
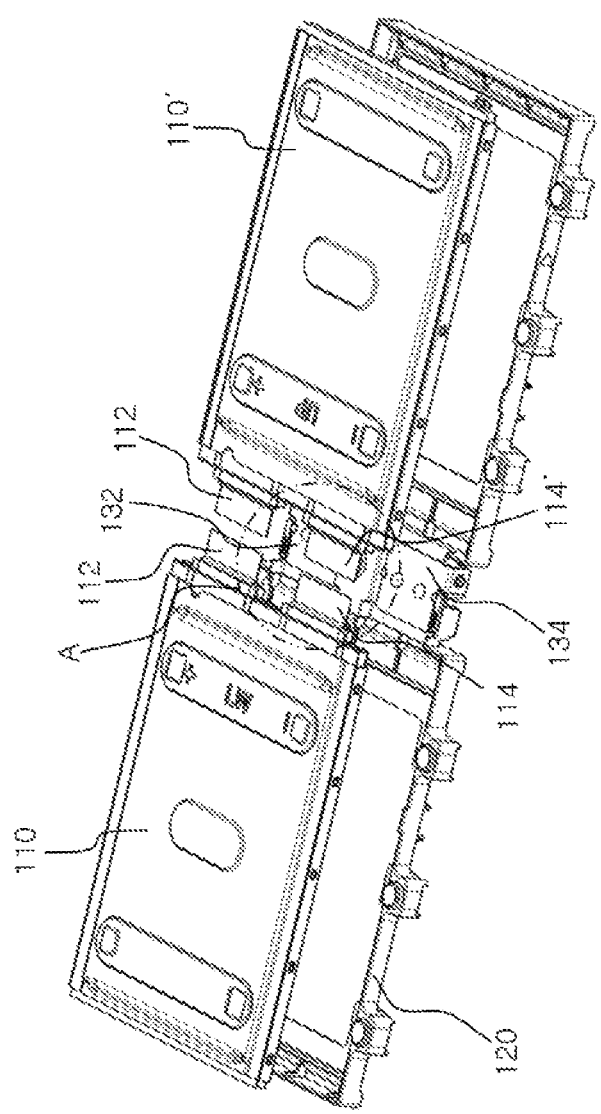

[FIG. 6]
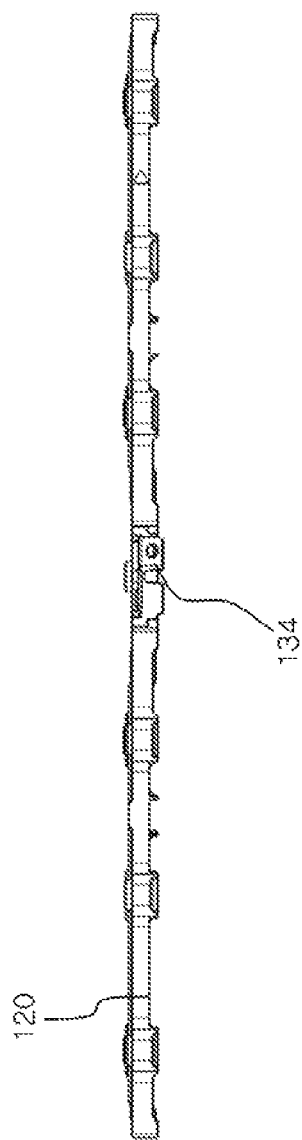

【FIG. 7】
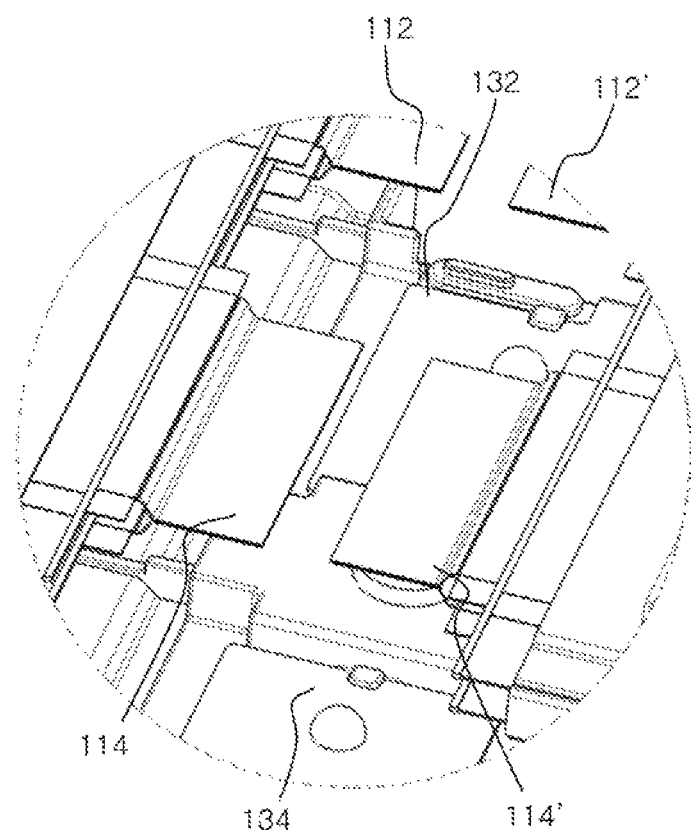

[FIG. 8]
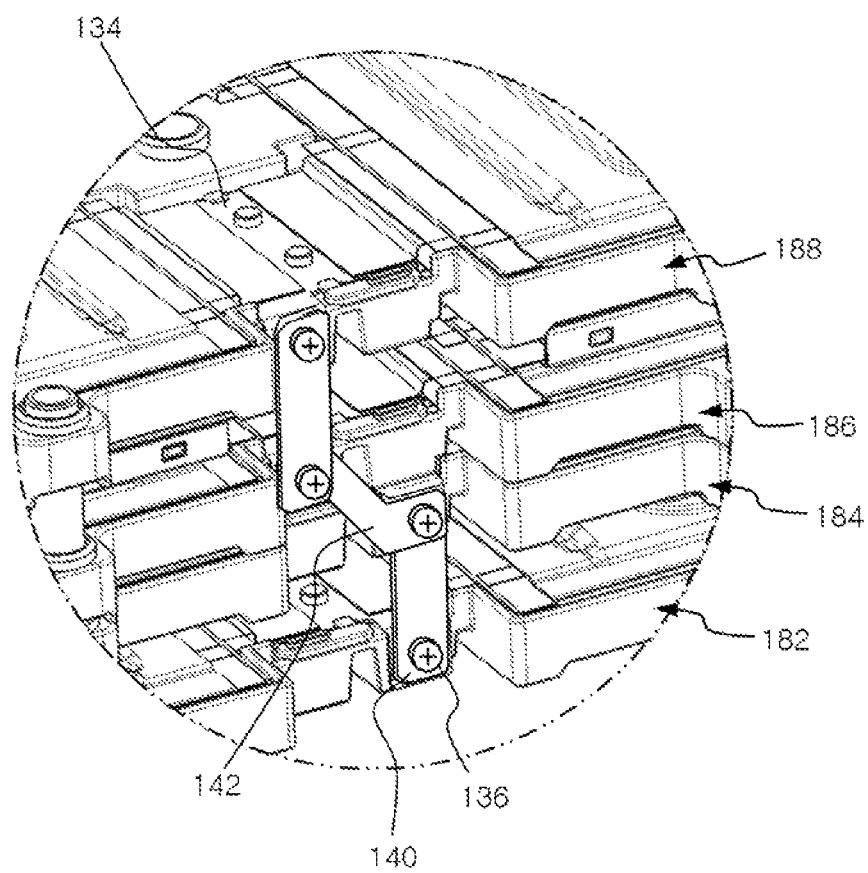

【FIG. 9】
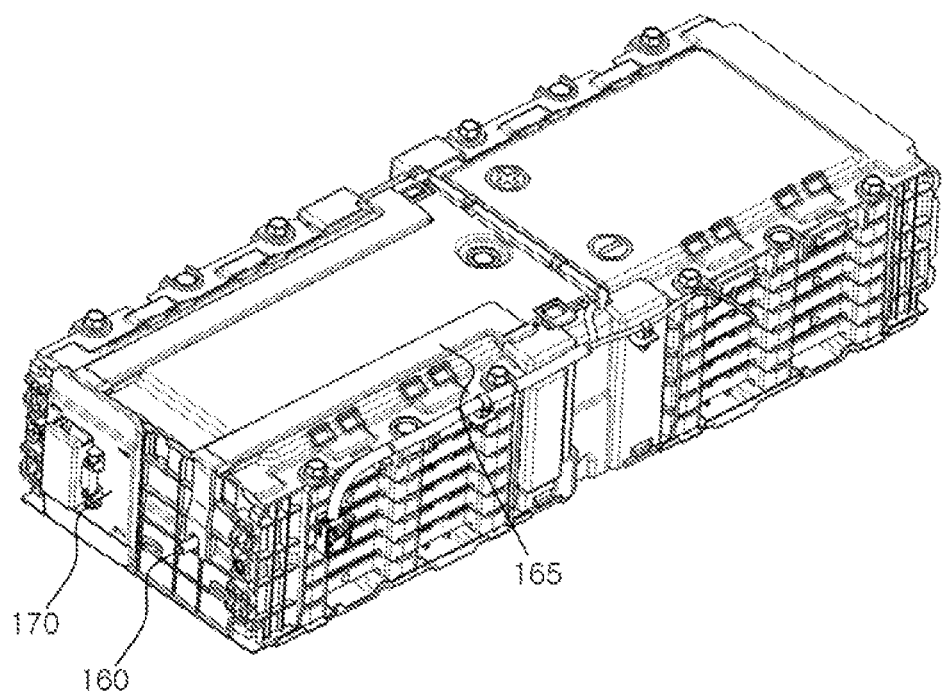
【FIG. 10】
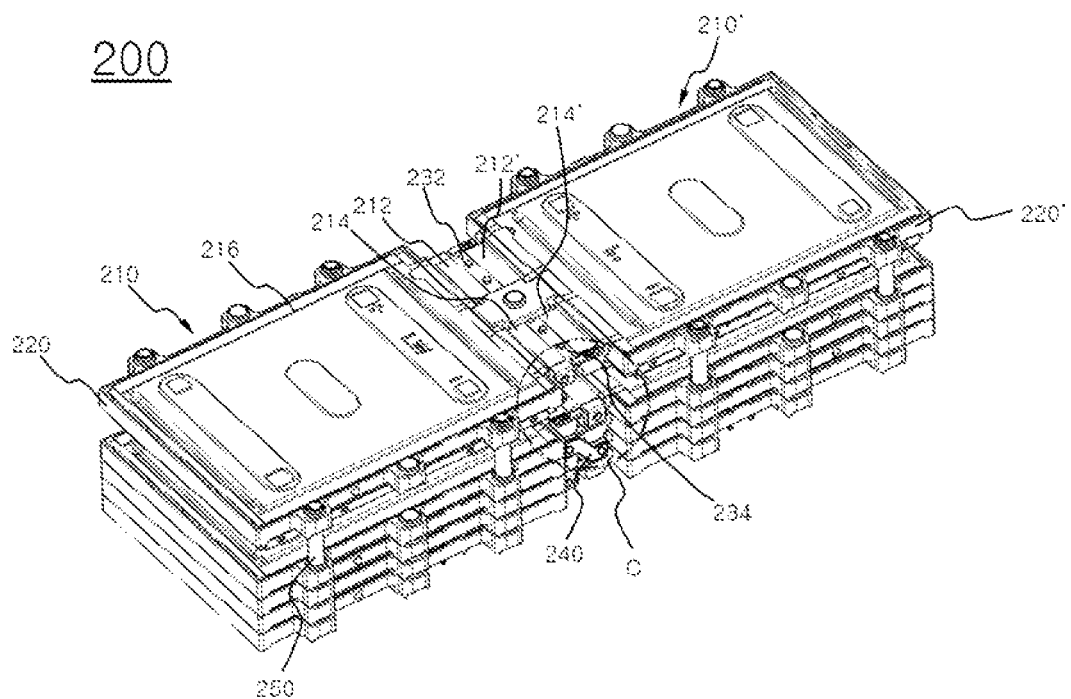

[FIG. 11]
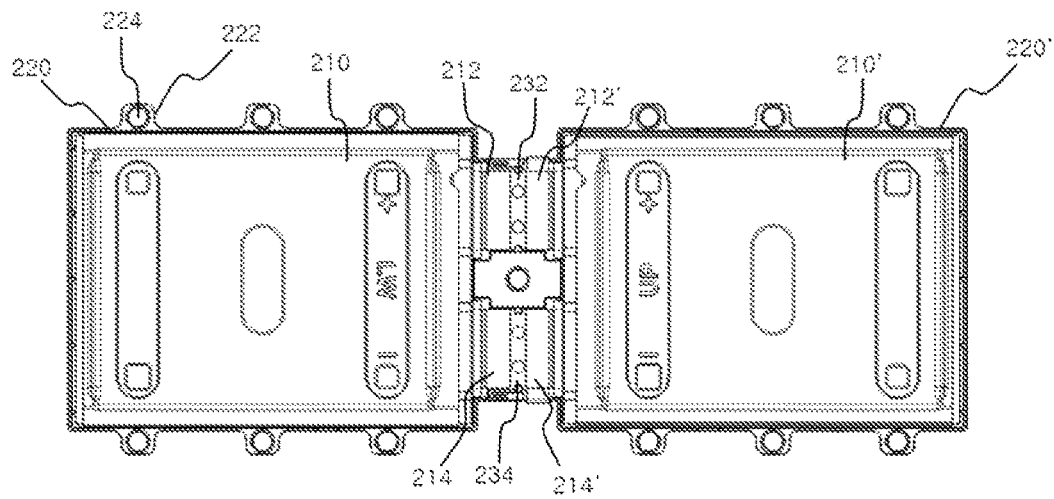
[FIG. 12]
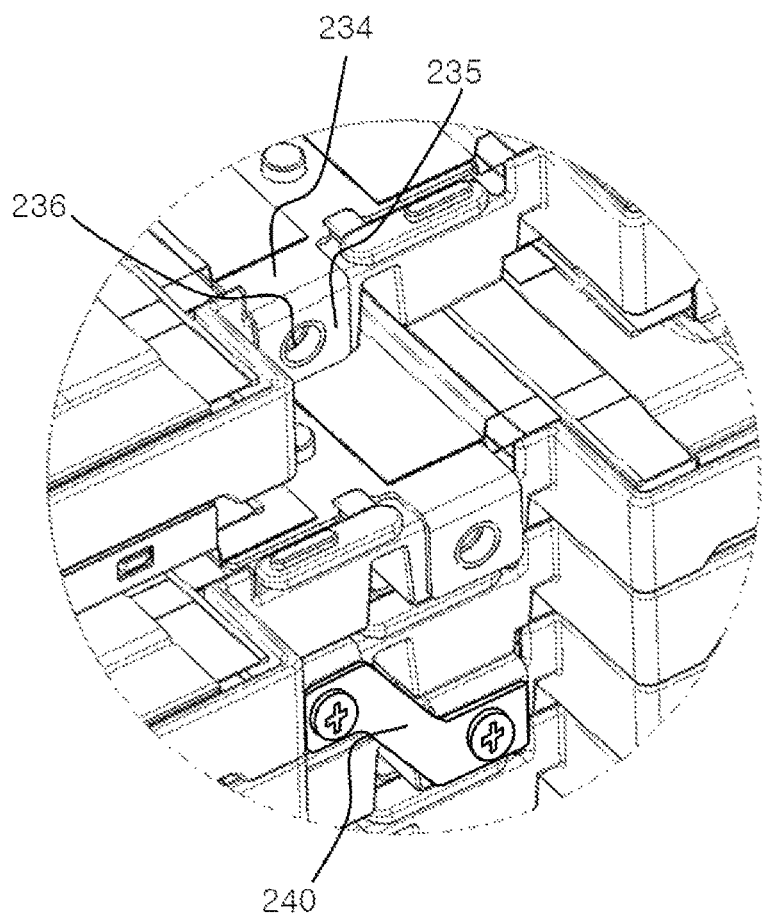

STACKED TYPE BATTERY MODULE HAVING EASILY MODIFIABLE CONNECTION STRUCTURE

TECHNICAL FIELD

The present invention relates to a stacked battery module having an easily changeable connection structure, and more particularly to a battery module including unit cells, each of which has electrode terminals formed at one side thereof, cartridges for fixing the unit cells, respectively, and busbars coupled to the electrode terminals for electrically interconnecting the unit cells, wherein the unit cells are mounted at the respective cartridges such that the electrode terminals are opposite to each other, and the electrode terminals are connected in parallel to each other via the busbars for parallel connection, which are mounted at the respective cartridges, such that the cartridges have unit cell parallel connection structures, and wherein the cartridges are stacked such that the unit cell parallel connection structures are arranged in a height direction from a ground, and the unit cell parallel connection structures are connected to each other via a series connection member and/or a parallel connection member for connecting the unit cell parallel connection structures in series and/or in parallel to each other.

BACKGROUND ART

In recent years, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

In addition, technology related to a power storage apparatus that stores electric power and stably supplies the stored electric power to a power system when needed has been developed. The power storage apparatus is an apparatus that stores electric power when power demand is low and supplies the stored electric power in case of overload or emergency. The power storage apparatus provides the effect of improving quality of electric power and energy efficiency. In particular, a market for a household power storage apparatus and a middle-sized industrial or commercial power storage apparatus has been rapidly expanding as the power storage apparatuses are related to smart grid technology.

Meanwhile, for a battery module to provide output and capacity required by a predetermined apparatus or device, it is necessary for the battery module to be configured to have a structure in which a plurality of battery cells is electrically connected to each other in series or in parallel. In addition, it is necessary for the battery module to be configured to have a structure which is easily extendable and stable as the capacity of the battery module is increased.

Particularly, in a case in which a plurality of battery cells is used to constitute a battery module, a large number of members, such as busbars and power cables, are needed for mechanical fastening and electrical connection between the battery cells, and a process of assembling the members is very complicated. In addition, in a case in which it is necessary to extend the battery module, it is difficult to modify the structure of the battery module. Furthermore, a large number of components are additionally needed, which increases cost of manufacturing the battery module.

Therefore, there is a high necessity for technology that is capable of fundamentally solving the above problems.

DISCLOSURE

Technical Problem

The present invention has been made to solve the above problems, and other technical problems that have yet to be resolved.

It is an object of the present invention to provide a battery module configured such that the addition of components constituting the battery module is minimized, thereby improving manufacturing processability and reducing manufacturing cost.

It is another object of the present invention to provide a battery module configured such that the assembly of the battery module is easy, a connection structure of the battery module is easily modifiable and extendable through a simple process, and the battery module is compact and structurally stable.

Technical Solution

In accordance with one aspect of the present invention, the above and other objects can be accomplished by the provision of a battery module including unit cells, each of which has electrode terminals formed at one side thereof, cartridges for fixing the unit cells, respectively, and busbars coupled to the electrode terminals for electrically interconnecting the unit cells, wherein the unit cells are mounted at the respective cartridges such that the electrode terminals are opposite to each other, and the electrode terminals are connected in parallel to each other via the busbars for parallel connection, which are mounted at the respective cartridges, such that the cartridges have unit cell parallel connection structures, and wherein the cartridges are stacked such that the unit cell parallel connection structures are arranged in a height direction from a ground, and the unit cell parallel connection structures are connected to each other via a series connection member and/or a parallel connection member for connecting the unit cell parallel connection structures in series and/or in parallel to each other.

That is, the battery module according to the present invention includes a structure in which a plurality of battery cells is connected in parallel to each other to constitute unit cell parallel connection structures, and the unit cell parallel connection structures are stacked in a state in which the unit cell parallel connection structures are connected in series or in parallel to each other. Consequently, it is possible to easily assemble the battery module and to extend the battery module to a series structure, a parallel structure, or a series and parallel structure through a simple process.

In addition, in the battery module according to the present invention, the unit cells are mounted at the cartridges in a state in which the unit cells are specifically arranged on the cartridges. Consequently, the battery module is compact, and is structurally stable.

In a concrete example, each of the unit cells may be a single plate-shaped battery cell, or may be a battery cell assembly configured to have a structure in which two or more plate-shaped battery cells are mounted in a cell cover in a state in which electrode terminals are exposed.

For example, the plate-shaped battery cell may be a pouch-shaped battery cell configured to have a structure in which an electrode assembly is mounted in a battery case made of a laminate sheet including a metal layer and a resin layer.

Specifically, the battery cell may be a pouch-shaped battery cell configured to have a structure in which an electrode assembly of a positive electrode/separator/negative electrode structure is contained in a battery case together with an electrolyte in a sealed state. The battery cell may be a plate-shaped battery cell configured to have an approximately rectangular hexahedral structure having a small thickness to width ratio. In general, the pouch-shaped battery cell may include a pouch-shaped battery case. The battery case is configured to have a laminate sheet structure in which an outer coating layer made of a polymer resin exhibiting high durability, a barrier layer made of a metal material blocking moisture or air, and an inner sealant layer made of a thermally bondable polymer resin are sequentially stacked.

The battery case of the pouch-shaped battery cell may be configured to have various structures. For example, the case of the pouch-shaped battery cell may be configured to have a structure in which an electrode assembly is received in a receiving part formed at an upper inner surface and/or a lower inner surface of a two-unit member, and the upper and lower contact regions of the outer edge of the battery case are sealed by thermal bonding. The pouch-shaped battery cell with the above-stated construction is disclosed in PCT International Application No. PCT/KR2004/003312, which has been filed in the name of the applicant of the present patent application. The disclosure of the above-mentioned patent application is hereby incorporated by reference as if fully set forth herein. On the other hand, the battery case may be configured to have a structure in which an electrode assembly is received in a receiving part formed at an upper inner surface and/or a lower inner surface of a one-unit member, and the upper and lower contact regions of the outer edge of the battery case are sealed by thermal bonding.

The battery cell is not particularly restricted so long as the battery cell is capable of providing high voltage and high current when a battery module assembly or a battery pack is manufactured using the battery cell. For example, the battery cell may be a lithium secondary battery having a large amount of energy storage per volume.

In another example of each of the unit cells, the cell cover may include a pair of sheathing members coupled to each other for covering outer surfaces of the battery cells excluding the electrode terminals. For example, two battery cells may be mounted in the cell cover, and the two battery cells may be stacked in the cell cover such that electrode terminals having the same polarities are connected in parallel to each other while being adjacent to each other.

Meanwhile, the unit cell parallel connection structures may be fixed in a state of being stacked. For example, each of the cartridges included in each of the unit cell parallel connection structures may be provided at opposite sides thereof with protrusions, each of which has a fastening hole, and the cartridges may be coupled to each other by inserting cartridge fastening members through the fastening holes.

In this structure, the protrusions formed at the opposite sides of each cartridge may be arranged symmetrically with respect to the middle of each cartridge, thereby providing a stable coupling structure between the cartridges.

The busbars for parallel connection, to which the electrode terminals of the unit cells are coupled, may be coupled to the cartridges. In a concrete example, opposite ends of the busbars may be coupled to the cartridges.

The electrode terminals of the unit cells may be coupled to the busbars for parallel connection using various methods, such as welding, soldering, and mechanical fastening. Preferably, the electrode terminals of the unit cells are coupled to the busbars for parallel connection by laser welding or ultrasonic welding.

Meanwhile, the battery module according to the present invention may be configured to have various connection structures based on the form in which the unit cell parallel connection structures are stacked and the selection of connection members.

In a concrete example, one end of a surface of each of the busbars for parallel connection of each of the unit cell parallel connection structures to which the electrode terminals are coupled may be bent upward or downward.

The series connection member may be coupled to the bent end of each of the busbars for parallel connection, and the bent end of each of the busbars for parallel connection may be located outside the unit cell parallel connection structures, which are stacked. The series connection member may interconnect busbars of adjacent unit cell parallel connection structures to form a series structure.

Coupling holes may be formed at the bent end of each of the busbars for parallel connection and at one end of the series connection member, and bolts, bolts-nuts, or clinching nuts may be electrically and mechanically fastened to the coupling holes.

The busbars for parallel connection may include a first busbar and a second busbar, wherein the first busbar may be connected to positive electrode terminals of the unit cells, and the second busbar may be connected to negative electrode terminals of the unit cells. In this case, the unit cell parallel connection structures may be stacked such that the first busbar and the second busbar are alternately arranged. The first busbar and the second busbar may be alternately arranged through various processes. For example, an upper cartridge may be stacked on a lower cartridge in s state in which the upper cartridge is rotated by 180 degrees with respect to the lower cartridge on a plane such that the first busbar and the second busbar are alternately arranged.

Consequently, the battery module may be configured to have a series connection structure in which the unit cells are connected in parallel to each other to constitute unit cell parallel connection structures, the unit cell parallel connection structures are stacked such that the unit cell parallel connection structures are alternatively arranged, and the unit cell parallel connection structures are connected to each other via the series connection member.

In a concrete example, one end of a surface of each of the busbars for parallel connection of each of the unit cell parallel connection structures to which the electrode terminals are coupled may be bent upward or downward, and the parallel connection member and the series connection member may be coupled to the bent end of each of the busbars for parallel connection. Coupling holes may be formed at the bent end of each of the busbars for parallel connection, at one end of the parallel connection member, and at one end of the series connection member, and bolts, bolts-nuts, or clinching nuts may be electrically and mechanically fastened to the coupling holes.

In this structure, bent ends of at least two of the busbars for parallel connection may be connected in series to each other via the series connection member, and at least one of the busbars for parallel connection that are connected to each other via the series connection member may be connected in parallel to the remaining busbars for parallel connection via the parallel connection member.

Consequently, it is possible to adjust or increase the capacity of the battery module through parallel connection of the unit cell parallel connection structures and, in addition, to adjust or increase the output of the battery module through series connection of some of the unit cell parallel connection structures.

The number of unit cell parallel connection structures that are connected in series to each other as described above is not particularly restricted. The number of unit cell parallel connection structures that are connected in series to each other may be appropriately changed as needed. In addition, two or more unit cell parallel connection structures that are connected in series to each other may be manufactured, and may then be connected in parallel to each other.

In a concrete example of the series connection of the unit cell parallel connection structures, the busbars for parallel connection may include a first busbar and a second busbar, wherein the first busbar may be connected to positive electrode terminals of the unit cells, and the second busbar may be connected to negative electrode terminals of the unit cells. In this case, the busbars for parallel connection that are connected in series to each other via the series connection member may be stacked such that the first busbar and the second busbar are alternately arranged on a per cartridge basis.

The first busbar and the second busbar may be alternately arranged through various processes. For example, an upper cartridge may be stacked on a lower cartridge in s state in which the upper cartridge is rotated by 180 degrees with respect to the lower cartridge on a plane such that the first busbar and the second busbar are alternately arranged.

That is, in the structure in which the cartridges are stacked such that the first busbar, which is connected to positive electrode terminals of the unit cells, and the second busbar, which is connected to negative electrode terminals of the unit cells, are alternately arranged as described above, the first busbar and the second busbar of the cartridges, which are vertically stacked, may be connected to each other using the series connection member, thereby achieving series connection.

In a concrete example, the unit cells of each of the unit cell parallel connection structures may be mounted at the respective cartridges in a state in which the unit cells are arranged symmetrically with respect to the busbars for parallel connection. That is, the unit cells having the electrode terminals connected to the busbars for parallel connection may be arranged symmetrically with respect to the busbars for parallel connection. In this case, the cartridges, which fix the unit cells, may also be arranged symmetrically with respect to the busbars for parallel connection such that the cartridges correspond to the respective unit cells.

Meanwhile, the battery module may further include an external input and output terminal, which is electrically connected to the outside. The external input and output terminal may be electrically connected to the busbars. For example, the external input and output terminal may be formed at one side of the outer surface of the stacked unit cell parallel connection structures, and may be electrically connected to a connection member for interconnecting the busbars and the external input and output terminal.

In accordance with another aspect of the present invention, there is provided a battery pack including the battery module with the above-stated construction as a unit module.

The battery pack may be manufactured by combining battery modules as unit modules according to desired output and capacity. In consideration of installation efficiency and structural stability, the battery pack may be used as a power source for a household power supply, a power supply for public facilities, a power supply for large-sized stores, a power supply for emergency, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle. However, the present invention is not limited thereto.

In accordance with a further aspect of the present invention, there is provided a device including the battery pack as a power source. Specifically, the device may be a household power supply, a power supply for public facilities, a power supply for large-sized stores, a power supply for emergency, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle.

The structure and manufacturing method of the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view showing a battery cell constituting a unit cell of a battery module according to the present invention;

FIG. 2 is a perspective view showing a unit cell configured to have a structure in which battery cells, one of which is shown FIG. 1, are mounted in a cell cover;

FIG. 3 is a perspective view showing a battery module according to an embodiment of the present invention;

FIG. 4 is a plan view of FIG. 3;

FIG. 5 is a perspective view showing a structure in which unit cells are mounted at cartridges;

FIG. 6 is a side view of FIG. 5;

FIG. 7 is an enlarged view showing portion A of FIG. 5;

FIG. 8 is an enlarged view showing portion B of FIG. 3;

FIG. 9 is a perspective view showing a structure in which an external input and output terminal is formed at the battery module of FIG. 3;

FIG. 10 is a perspective view showing a battery module according to another embodiment of the present invention;

FIG. 11 is a plan view of FIG. 10; and

FIG. 12 is an enlarged view showing portion C of FIG. 10.

BEST MODE

Now, exemplary embodiments of the present invention will be described in detail with reference to the accompanying drawings. It should be noted, however, that the scope of the present invention is not limited by the illustrated embodiments.

FIG. 1 is a perspective view showing a battery cell constituting a unit cell of a battery module according to the present invention, and FIG. 2 is a perspective view showing a unit cell configured to have a structure in which battery cells, one of which is shown FIG. 1, are mounted in a cell cover.

Referring to FIG. 1, a battery cell 10 is a plate-shaped battery cell 10 having electrode terminals (a positive electrode terminal 11 and a negative electrode terminal 12) formed at one end thereof. Specifically, the plate-shaped battery cell 10 is configured to have a structure in which an electrode assembly (not shown) is mounted in a pouch-shaped battery case 13 made of a laminate sheet including a metal layer (not shown) and a resin layer (not shown), and a sealed portion 14 is formed at the battery case 13, for example, by thermal bonding. Generally, the battery cell with the above-stated construction may also be referred to as a pouch-shaped battery cell.

Referring to FIG. 2, a unit cell 110 is configured to have a structure in which two plate-shaped battery cells are mounted in a cell cover 116 in a state in which electrode terminals 112 and 114 are exposed from one side of the cell cover 116. The cell cover 116 of the unit cell 110 includes a pair of sheathing members coupled to each other for covering outer surfaces of the battery cells excluding the electrode terminals 112 and 114. The battery cells are mounted in the cell cover 116 such that the battery cells are stacked, and the electrode terminals 112 and 114 of the battery cells are exposed outward from the cell cover in a state in which the same polarities of the electrode terminals 112 and 114 are connected in parallel to each other while being adjacent to each other.

FIG. 3 is a perspective view showing a battery module according to an embodiment of the present invention, and FIG. 4 is a plan view of FIG. 3.

Referring to FIGS. 3 and 4, a battery module 100 is configured to have a structure including unit cells 110 and 110', the unit cell 110 having electrode terminals 112 and 114 formed at one side thereof, the unit cell 110' having electrode terminals 112' and 114' formed at one side thereof, cartridges 120 and 121 for fixing the unit cells 110 and 110', respectively, and busbars 132 and 134 coupled to the electrode terminals 112, 114, 112', and 114' for electrically interconnecting the unit cells 110 and 110'.

The unit cells 110 and 110' are mounted at the cartridges 120 and 121 such that the electrode terminals 112, 114, 112', and 114' are opposite to each other, and the electrode terminals 112, 114, 112', and 114' are connected in parallel to each other via the busbars 132 and 134 for parallel connection, which are mounted at the cartridges 120 and 121, such that the cartridges 120 and 121 have unit cell parallel connection structures.

The cartridges 120 and 121 are stacked such that the unit cell parallel connection structures are arranged in a height direction from the ground. In order to electrically interconnect the unit cell parallel connection structures, a parallel connection member 140 is coupled to the busbars 132 and 134 for parallel connection, which are included in each of the unit cell parallel connection structures.

Each of the cartridges 120 and 121 is provided at opposite sides thereof with protrusions 122, each of which has a fastening hole 124. The cartridges 120 and 121 are fixed in a state in which the cartridges 120 and 121 are stacked by stacking the cartridges 120 and 121 and then inserting fastening members 150 through the fastening holes 124 of the cartridges 120 and 121. The protrusions 122 of the cartridges 120 and 121 are arranged symmetrically with respect to the middle of each cartridge such that the cartridges 120 and 121 are alternately arranged in a state in which a stable coupling structure is provided between the cartridges 120 and 121.

FIG. 5 is a perspective view showing a structure in which unit cells are coupled to cartridges, and FIG. 6 is a side view showing a unit cell parallel connection structure in which the unit cells are coupled to the cartridges.

Referring to FIGS. 5 and 6 together with FIG. 1, the busbars for parallel connection include a first busbar 132 and a second busbar 134. The first busbar 132 is connected to the positive electrode terminals 112 and 112' of the unit cells 110 and 110', and the second busbar 134 is connected to the negative electrode terminals 114 and 114' of the unit cells 110 and 110'.

In order to easily achieve electrical connection with a series connection member, unit cell parallel connection structures are stacked such that the first busbar 132 and the second busbar 134 are alternately arranged in a vertical direction. The first busbar 132 and the second busbar 134 may be alternately arranged in various fashions. The upper cartridge may be stacked on the lower cartridge such that the upper cartridge is rotated by 180 degrees with respect to the lower cartridge on the plane in a state in which the unit cells 110 and 110' are mounted at the cartridges 120. As a result, the cartridges may be stacked such that the first busbar 132 and the second busbar 134 are alternately arranged. The structure in which the busbars are stacked is shown in an enlarged view of FIG. 8.

FIG. 7 is an enlarged view showing portion A of FIG. 5.

Referring to FIG. 7 together with FIG. 5, the unit cells 110 and 110' are mounted at the cartridges 120 and 121 in a state in which the unit cells 110 and 110' are arranged symmetrically with respect to the busbars 132 and 134 for parallel connection. In this case, the cartridges 120 and 121, which fix the unit cells 110 and 110', are also arranged symmetrically with respect to the busbars 132 and 134 for parallel connection such that the cartridges 120 and 121 correspond to the unit cells 110 and 110', respectively.

The electrode terminals 112, 114, 112', and 114' of the unit cells 110 and 110' are coupled to the busbars 132 and 134 for parallel connection by welding such that the electrode terminals 112, 114, 112', and 114' of the unit cells 110 and 110' are electrically connected to the busbars 132 and 134.

The busbars 132 and 134 for parallel connection, to which the electrode terminals 112, 114, 112', and 114' of the unit cells 110 and 110' are coupled, are coupled to the cartridge 120. Specifically, the cartridges 120 and 121 are coupled to opposite ends of the busbars 132 and 134 for parallel connection.

FIG. 8 is an enlarged view showing portion B of FIG. 3.

Referring to FIG. 8 together with FIG. 3, one end of a surface of the busbar 134 for parallel connection to which the electrode terminals are coupled is bent downward. The parallel connection member 140 or a series connection member 142 is coupled to the bent end of the busbar 134 for parallel connection. The bent end of the busbar 134 for parallel connection is located outside the unit cell parallel connection structures 182, 184, 186, and 188, which are stacked. The parallel connection member 140 and the series connection member 142 interconnects busbars 134 for parallel connection of adjacent unit cell parallel connection structures such that the unit cell parallel connection structures are connected in parallel or in series to each other.

Coupling holes (not shown) are formed at the bent end of the busbar 134 for parallel connection, at one end of the parallel connection member 140, and at one end of the series connection member 142, and fastening members 136, such as bolts, bolts-nuts, or clinching nuts, are electrically and mechanically fastened to the coupling holes.

Of the unit cell parallel connection structures 182, 184, 186, and 188, the first unit cell parallel connection structure 182 and the second unit cell parallel connection structure 184 are connected in parallel to each other, the second unit cell parallel connection structure 184 and the third unit cell parallel connection structure 186 are connected in series to each other, and the third unit cell parallel connection structure 186 and the fourth unit cell parallel connection structure 188 are connected in parallel to each other.

The third unit cell parallel connection structure 186 and the fourth unit cell parallel connection structure 188 are stacked in a state in which the third unit cell parallel connection structure 186 and the fourth unit cell parallel connection structure 188 are rotated by 180 degrees on a plane with respect to the first unit cell parallel connection structure 182 and the second unit cell parallel connection structure 184. As a result, the busbar 134 for parallel connection exposed from one side has an opposite polarity. As shown in FIG. 8, therefore, the second unit cell parallel connection structure 184 and the third unit cell parallel connection structure 186 are connected in series to each other.

However, the above-described structure is merely an illustration. In addition to the structure shown in FIG. 8, the unit cell parallel connection structures may be connected to each other through various combinations of connection, e.g. in parallel or in parallel and series.

FIG. 9 is a perspective view showing a structure in which an external input and output terminal is formed at the battery module of FIG. 3.

Referring to FIG. 9 together with FIG. 3, an external input and output terminal 160 is formed at one side of the outer surface of the unit cell parallel connection structures of the battery module 100. The external input and output terminal 160 is electrically connected to the parallel connection member 140. This connection is achieved using a connection member 165 for interconnecting the external input and output terminal 160 and the parallel connection member 140. The connection member 165 is made of a plate-shaped conductive member. The connection member 165 extends along the outer surface of the stacked unit cell parallel connection structures. Opposite ends of the connection member 165 are connected to the external input and output terminal 160 and the parallel connection member 140, respectively.

In addition, a battery management system (BMS) 170 is mounted at the external input and output terminal 160 for detecting overvoltage, overcurrent, or overheating to control/protect the battery module 100.

FIG. 10 is a perspective view showing a battery module according to another embodiment of the present invention, FIG. 11 is a plan view of FIG. 10, and FIG. 12 is an enlarged view showing portion C of FIG. 10.

Referring to FIGS. 10 and 11, a battery module 200 is configured to have a structure including unit cells 210 and 210', the unit cell 210 having electrode terminals 212 and 214 formed at one side thereof, the unit cell 210' having electrode terminals 212' and 214' formed at one side thereof, cartridges 220 and 220' for fixing the unit cells 210 and 210', respectively, and busbars 232 and 234 coupled to the electrode terminals 212, 214, 212', and 214' for electrically interconnecting the unit cells 210 and 210'.

The unit cells 210 and 210' are mounted at the cartridges 220 and 220' such that the electrode terminals 212, 214, 212', and 214' are opposite to each other, and the electrode terminals 212, 214, 212', and 214' are coupled to the busbars 232 and 234 for parallel connection, which are mounted at the cartridges 220 and 220', such that the cartridges 220 and 220' have unit cell parallel connection structures.

The cartridges 220 and 220' are stacked such that the unit cell parallel connection structures are arranged in a height direction from the ground. In order to electrically interconnect the unit cell parallel connection structures, a series connection member 240 is coupled to the busbars 232 and 234 for parallel connection, which are included in each of the unit cell parallel connection structures.

Each of the cartridges 220 and 220' is provided at opposite sides thereof with protrusions 222, each of which has a fastening hole 224. The cartridges 220 and 220' are fixed in a state in which the cartridges 220 and 220' are stacked by stacking the cartridges 220 and 220' and then inserting fastening members 250 through the fastening holes 224 of the cartridges 220 and 220'. The protrusions 222 of the cartridges 220 and 220' are arranged symmetrically with respect to the middle of each cartridge such that the cartridges 220 and 220' are alternately arranged in a state in which a stable coupling structure is provided between the cartridges 220 and 220'.

FIG. 12 is an enlarged view showing portion C of FIG. 10.

Referring to FIG. 12 together with FIG. 10, one end 235 of a surface of the busbar 234 for parallel connection to which the electrode terminals are coupled is bent downward. The series connection member 240 is coupled to the bent end 235 of the busbar 234 for parallel connection. The bent end 235 of the busbar 234 for parallel connection is located outside the unit cell parallel connection structures, which are stacked. The series connection member 240 interconnects busbars 234 for parallel connection of adjacent unit cell parallel connection structures such that the unit cell parallel connection structures are connected in series to each other.

Coupling holes 236 are formed at the bent end 235 of the busbar 234 for parallel connection and at one end of the series connection member 240, and bolts, bolts-nuts, or clinching nuts, are electrically and mechanically fastened to the coupling holes.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery module according to the present invention includes a structure in which a plurality of battery cells is connected in parallel to each other to constitute unit cell parallel connection structures, and the unit cell parallel connection structures are stacked in a state in which the unit cell parallel connection structures are connected in parallel to each other. Consequently, it is possible to easily assemble the battery module and to extend the battery module to a parallel structure through a simple process.

In addition, in the battery module according to the present invention, a structure in which some of the unit cell parallel connection structures are connected in series to each other is added to the structure in which the unit cell parallel connection structures are stacked such that the unit cell parallel connection structures are connected in parallel to each other. Consequently, it is possible to easily achieve parallel and/or series combinations, whereby it is possible to easily adjust the capacity and output of the battery module through a simple process.

The invention claimed is:

1. A battery module comprising unit cells, each of which has electrode terminals formed at one side thereof, cartridges for fixing the unit cells, respectively, and busbars for parallel connection coupled to the electrode terminals for electrically interconnecting the unit cells, wherein the battery module includes at least first and second adjacent vertical stacks of cartridges, wherein respective electrode terminals of the unit cells of the first and second vertical stacks face one another and are connected to one another via a respective busbar, the respective busbar being disposed between the first vertical stack and the second vertical stack, wherein the electrode terminals of the unit cells of the first and second vertical stacks are connected in parallel to each other via the busbars for parallel connection, and the cartridges have unit cell parallel connection structures, wherein a positive electrode terminal of the unit cells of the first vertical stack is connected to a respective positive electrode terminal of the unit cells of the second vertical stack via a first busbar and a negative electrode terminal of the unit cells of the first vertical stack is connected to a respective negative electrode terminal of the unit cells of the second vertical stack via a second busbar, different from the first busbar, wherein the unit cell parallel connection structures are arranged in a vertical direction from a ground, and the unit cell parallel connection structures are connected to each other via a series connection member and/or a parallel connection member for connecting the unit cell parallel connection structures in series and/or in parallel to each other, and wherein one end of a surface of each of the busbars is bent upward or downward, and the series connection member and/or parallel connection member is coupled to the bent end of each of the busbars, the series connection member and the parallel connection member being disposed between the first vertical stack and the second vertical stack.

2. The battery module according to claim 1, wherein each of the unit cells is a single plate-shaped battery cell, or is configured to have a structure in which two or more plate-shaped battery cells are mounted in a cell cover in a state in which the electrode terminals are exposed.

3. The battery module according to claim 2, wherein the plate-shaped battery cell is configured to have a structure in which an electrode assembly is mounted in a battery case made of a laminate sheet comprising a metal layer and a resin layer, and an outer edge of the battery case is sealed.

4. The battery module according to claim 2, wherein the plate-shaped battery cell is a lithium secondary battery.

5. The battery module according to claim 2, wherein the cell cover comprises a pair of sheathing members coupled to each other for covering outer surfaces of the battery cells excluding the electrode terminals.

6. The battery module according to claim 2, wherein two battery cells are mounted in the cell cover.

7. The battery module according to claim 6, wherein the two battery cells are stacked in the cell cover such that electrode terminals having the same polarities are connected in parallel to each other while being adjacent to each other.

8. The battery module according to claim 1, wherein each of the cartridges is provided at opposite sides thereof with protrusions, each of which has a fastening hole, and the cartridges are coupled to each other by inserting cartridge fastening members through the fastening holes.

9. The battery module according to claim 8, wherein the protrusions formed at the opposite sides of each cartridge are arranged symmetrically with respect to a middle of each cartridge.

10. The battery module according to claim 1, wherein the busbars for parallel connection are coupled to the cartridges.

11. The battery module according to claim 1, wherein the electrode terminals of the unit cells are coupled to the busbars for parallel connection by laser welding or ultrasonic welding.

12. The battery module according to claim 1, wherein coupling holes are formed at the bent end of each of the busbars for parallel connection and at one end of the series connection member, and bolts, bolts-nuts, or clinching nuts are electrically and mechanically fastened to the coupling holes.

13. The battery module according to claim 1, wherein the unit cell parallel connection structures are stacked such that the first busbar and the second busbar are alternately arranged on a per cartridge basis.

14. The battery module according to claim 13, wherein an upper cartridge is stacked on a lower cartridge in a state in which the upper cartridge is rotated by 180 degrees with respect to the lower cartridge on a plane such that the first busbar and the second busbar are alternately arranged.

15. The battery module according to claim 1, wherein coupling holes are formed at the bent end of each of the busbars for parallel connection, at one end of the parallel connection member, and at one end of the series connection member, and bolts, bolts-nuts, or clinching nuts are electrically and mechanically fastened to the coupling holes.

16. The battery module according to claim 1, wherein the bent end of at least two of the busbars for parallel connection are connected in series to each other via the series connection member, and at least one of the busbars for parallel connection that are connected to each other via the series connection member is connected in parallel to the remaining busbars for parallel connection via the parallel connection member.

17. The battery module according to claim 1, wherein the unit cells of each of the unit cell parallel connection structures are mounted at the respective cartridges in a state in which the unit cells are arranged symmetrically with respect to the busbars for parallel connection.

18. The battery module according to claim 1, wherein an external input and output terminal, which is electrically connected to the series connection member, is formed at one side of an outer surface of the stacked unit cell parallel connection structures.

19. A battery pack comprising a battery module according to claim 1 as a unit module.

20. A device comprising a battery pack according to claim 19.

21. The device according to claim 20, wherein the device is a household power supply, a power supply for public facilities, a power supply for large-sized stores, a power supply for emergency, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle.

* * * * *